United States Patent [19]

Schipfer et al.

[11] Patent Number: 4,992,516

[45] Date of Patent: Feb. 12, 1991

[54] MODIFIED EPOXY RESIN/AMINE ADDUCT BY REACTING POLYAMINE/MONOEPOXIDE MODIFIER, POLYEPOXY RESINS AND AMINES

[75] Inventors: Rudolf Schipfer; Gerhard Schmölzer, both of Graz; Günther Monschein, Kalsdorf; Gerhard Meglitsch, Graz, all of Austria

[73] Assignee: Vianova Kunstharz, A.G., Werndorf, Austria

[21] Appl. No.: 395,514

[22] Filed: Aug. 18, 1989

[30] Foreign Application Priority Data

Aug. 18, 1988 [AT] Austria ................................ 2046/88

[51] Int. Cl.[5] ....................... C08G 59/50; C08G 59/64

[52] U.S. Cl. .................................... 525/526; 523/404

[58] Field of Search ................................ 523/404, 526

[56] References Cited

U.S. PATENT DOCUMENTS

| | | | |
|---|---|---|---|
| 4,089,826 | 5/1978 | Moss et al. | 523/404 |
| 4,116,900 | 9/1978 | Belanger | 523/404 |
| 4,539,347 | 9/1985 | De Gooyer | 523/404 |
| 4,608,405 | 8/1986 | De Gooyer | 523/404 |

*Primary Examiner*—Lewis T. Jacobs
*Assistant Examiner*—Robert E. L. Sellers, II
*Attorney, Agent, or Firm*—A. W. Breiner

[57] ABSTRACT

Cathodically depositable paint binders based on epoxy resin/amine adducts modified with diamine bridges which carry longer-chained substituents are described. The diamine bridges are the reaction products of diprimary amines and mono- and diepoxy compounds. The modified epoxy resin/amine adducts have low viscosities and low glass transition temperatures in spite of their high molecular weights. The stoved films, even with higher film thickness, have flawless surfaces and excellent mechanical properties.

4 Claims, No Drawings

MODIFIED EPOXY RESIN/AMINE ADDUCT BY REACTING POLYAMINE/MONOEPOXIDE MODIFIER, POLYEPOXY RESINS AND AMINES

FIELD OF INVENTION

This invention relates to cathodically depositable paint binders. More particularly, this invention relates to cathodically depositable paint binders based on epoxy resins/amine adducts modified to include diamine bridges and to a method of preparing the binders.

BACKGROUND OF INVENTION

Binders useful in electrodeposition painting systems require, in many cases, totally contradictory properties for the various stages of the painting process, which includes the paint manufacture, electrodeposition of the paint, and the stoving process to ensure satisfactory film properties such as good surface quality, high throwing power, and good corrosion resistance. Various other requirements by the consumers, such as a low content of organic solvents or restrictions in the choice of the other paint components, must also be taken into consideration.

Thus, although containing only small amounts of organic solvents, the binders must have a low viscosity to ensure favorable dilution characteristics, including in the bath replenishing process in the electrodeposition plant, and good pigmentability. On the other hand, a high molecular weight of the binders is essential for obtaining good resistance qualities of the crosslinked films, but usually high molecular weight is associated with a high viscosity of the binder. Similarly, contradictory demands exist in the formation of a high electrical resistance in the film during deposition in order to achieve high throwing power and the simultaneous desire for a relatively thick film layer having excellent surface quality. From the literature it is seen that a number of attempts have been made to find a compromise between optimum solubility or dispersibility of the protonized binders and their deposition characteristics, or the properties of the crosslinked paint films by various modifications of bisphenol A or phenol novolak-/epoxy resin/amine adducts.

For example, in U.S. Pat. Nos. 4,104,147 or 4,148,772 an epoxy resin based on bisphenol A and epichlorohydrin is reacted, before the reaction with an amine, with a polytetramethyleneglycol, with lengthening of the chain, and in this way a hydrophilic segment is incorporated into the binder molecule. U.S. Pat. Nos. 3,839,252 and 4,035,275 also propose chain lengthening with polypropyleneglycol before reaction with an amine. Another way of introducing polyalkyleneglycol segments consists, according to EP-A2-00 74 634, in lengthening the chain of low molecular bisphenol A/epoxy resins with bisphenol A ethylene oxide adducts.

A major disadvantage of those methods is the difficulty of controlling such chain lengthening reactions since self-condensations of the epoxy resin cannot be totally avoided. Even if the initial products have the theoretical epoxide value, free polyglycols are probably still present which will substantially influence the physical and chemical properties of the binders.

Protonized epoxide/amine adducts based on polyoxyalkyleneglycidylethers, as disclosed for example in U.S. Pat. No. 4,035,275, have proved to be extremely soluble in water. However, these products are difficult to precipitate electrically in the form of usable films and, as might be expected, have serious defects in terms of their film resistance qualities.

Cationically modified epoxy resins which are soluble in water at pH-values of above 7 can be obtained by incorporating quaternary ammonium groups, i.e., by reacting the epoxide groups with tertiary amines in the presence of acids and/or water. Products of this kind, as described for example in U.S. Pat. No. 4,035,275, have in practice proved suitable for use as sole binders only when the specifications are not too stringent. These resins can be used, however, as partial replacement binders.

Austrian Pat. No. 381,115 describes the incorporation of polyoxyalkyl segments in epoxide/amine adducts by reaction of the epoxide/amine adducts with polyoxyalkyleneglycidylethers. Although such segments improve the solubility and dispersibility of the partially neutralized polymers, additional modifiers have to be incorporated in order to ensure that the polymers are sufficiently flexible. Products which are insufficiently plasticized have high glass transition temperatures and defective flow properties of the wet films in the stoving range of from 120° C. to 180° C. This results in serious deficiencies in the "flow," resulting in films of insufficient thickness.

For the purpose of elastification, epoxy resins or epoxy-functional epoxide/amine adducts may be defunctionalized with epoxide-reactive compounds. This can be achieved using monocarboxyl compounds such as monocarboxylic acids of various chain lengths or monoesters of dicarboxylic acids, using longer-chained dicarboxylic acids such as adipic acid and the higher homologues thereof, as well as dimerized fatty acids and the like. To a small extent, polycarboxyl compounds such as maleinized oils or polybutadienes may be used for this purpose. Defunctionalization may also be carried out with polyesters carrying carboxyl groups, with the polyesters optionally being modified with fatty acids. In addition, plastification of the polymer by reacting an epoxide/amine adduct with monoglycidylethers or esters is also possible.

In practice, as the degree of modification increases, all such possible modifications have disadvantages such as a reduction in the wet film resistance and in voltage resistance, and consequently a deterioration in the throwing power; the formation of cleavage products during stoving of the deposited films; reduced resistance qualities of the stoved films, and a deterioration in their adhesion to any subsequent coats.

SUMMARY OF INVENTION

It has now been found that optimum adaptation of the binders to the divergent requirements of cathodically depositable binders can be achieved by modifying epoxy resin/amine adducts with specifically synthesized diamine bridges.

The invention relates, therefore, to cathodically depositable paint binders based on modified epoxy resin/amine adducts wherein the binders contain from about 5% to 30% by weight, preferably 10% to 20% by weight, based on a modified epoxy resin/amine adduct, of a modifier of general formula

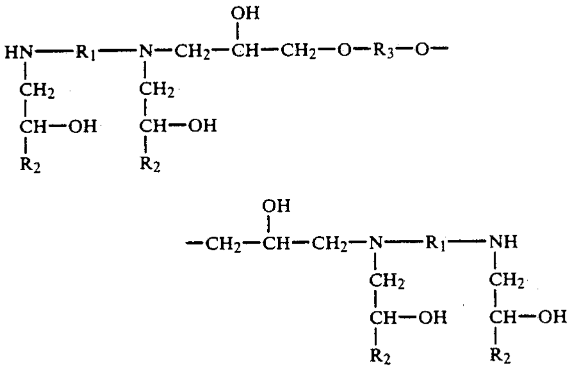

wherein $R_1$ represents the same or different groups $-C_nH_{2n}-$ or $-(C_nH_{2n}O)_m-C_nH_{2n}-$ or

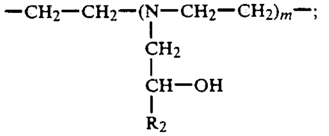

$R_2$ represents the same or different groups $-C_nH_{2n+1}$ or $-O-C_nH_{2n+1}$ or 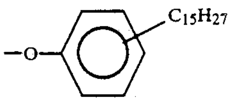

$R_3$ represents the group

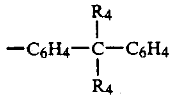 or $-(C_nH_{2n}O)_m-$ or

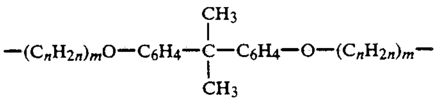

$R_4$ represents a hydrogen atom or a methyl group, n and m are integers between 2 and 8 but, in the case of $R_2$, n represents an integer between 8 and 20, and which has been reacted with at least 2 mol of a polyepoxy resin, such as a diepoxy resin, and primary-tertiary diamines and primary and/or secondary alkyl- and/or alkanolamines to form an epoxy resin/amine adduct which is free from epoxide groups, water-dilutable after neutralization with acids and has a molecular weight of 4,000 to 16,000 (by the weight method) or 1,500 to 3,000 (by the counting method), a glass transition temperature of +20° C. to +45° C., and an amine number of at least 20 mg KOH/g.

The invention further relates to a process for producing cathodically depositable paint binders based on modified epoxy resin/amine adducts, which is characterized in that (A) a diprimary aliphatic polyamine, such as a diamine, is reacted with an aliphatic monoglycidyl and/or monoepoxide compound, the aliphatic group of which contains 8 to 20 carbon atoms, at 40° C. to 60° C. in the presence of a solvent inert in the reaction, in quantities such that the reaction product has two secondary amino groups, (B) 2 mol of the intermediate product (A) are reacted at 40° C. to 80° C. with 1 mol of a diglycidyl compound, and (C) 5% to 30% by weight, preferably 10% to 20% by weight, based on the modified epoxy resin/amine adduct, of this modifier (AB), which contains, per molecule, 2 secondary amino groups and has a glass transition temperature of less than −15° C., are reacted with di- or polyepoxy resins, and primary-tertiary diamines and primary and/or secondary alkyl- and/or alkanolamines to form an epoxy resin/amine adduct which is free from epoxide groups and is water-dilutable after neutralization with acids and has a molecular weight of 4,000 to 16,000 (weight method) or 1,500 to 3,000 (counting method), a glass transition temperature of +20° C. to +45° C., and an amine number of at least 20 mg KOH/g.

The invention further relates to the use of the binders produced according to this invention for formulating electrodeposition paints.

The amine modifier according to this invention decisively improves the solubility characteristics and dispersibility of the binder, although the basicity of the modifier on its own is not sufficient to impart adequate water-dilutability to the end product, even after 100% protonization. In addition, this modifier results in good throwing power qualities and, in the stoved films, provides good flexibility at high layer thickness; and, because of the low glass transition temperature of the high molecular polymers, defect-free film surfaces are achieved.

To produce the modifiers which are used to lengthen the chains of the epoxy resins, diprimary aliphatic diamines of the ethylene diamine type and its homologues are used. Similarly, it is also possible to use diamines containing ether groups, such as those which are commercially available, for example, under the tradename "JEFFAMIN." Similarly, it is also possible to use diprimary polyamines, particularly diethylene triamine.

The diprimary amines referred to above are reacted in a first reaction step with an aliphatic monoglycidyl or monoepoxide compound, the aliphatic group of which contains 8 to 20 carbon atoms. Examples include alkylglycidylethers, olefin oxides such as dodecene oxide, or glycidyl esters such as the glycidyl esters of KOCH acids. The proportions are chosen so that the reaction product has 2 NH-groups. Advantageously, the monoglycidyl or monoepoxide compound is used in an excess of from 2% to 6% by weight per mol. The reaction is carried out in the presence of an inert solvent at a temperature of between 40° C. and 60° C.

In the next step, 2 mol of this intermediate product as above produced are reacted with 1 mol of a diglycidyl compound at 40° C. to 80° C. An adduct compound containing two secondary amino groups is obtained. The products should have a glass transition temperature of less than −15° C., and this should be taken into consideration when choosing the raw materials for the modifier component.

The diglycidyl compounds used are diepoxy resins of the bisphenol A or F type, aliphatic diepoxy compounds based on polyoxyalkyleneglycol or aromatic-aliphatic diepoxide compounds, e.g., those based on a polyoxypropyleneglycol-modified bisphenol A. The epoxy resins have an epoxide equivalent weight of between about 180 and 500. The reaction product thus obtained is used as a chain-lengthening modifier for the epoxy resin/amine adducts. From about 5% to 30% by weight, preferably 10% to 20% by weight, of the modifier, based on the epoxy resin/amine adduct, is advantageously reacted, in a graduated reaction, together with primary-tertiary alkyldiamines, primary alkyl- and/or alkanolamines and secondary alkyl- and/or alkanolamines to obtain an epoxy resin/amine adduct free from epoxide groups.

Advantageously, 10% to 50% of the epoxide equivalents used are reacted with the modifier. The epoxy resins used in this reaction step are preferably the bisphenol diglycidylethers or epoxy resins based on a novolak with an epoxy equivalent weight of between 180 and 500.

The remaining free epoxide groups are reacted with amines which give the end product the required water-dilutability, after protonization. At the same time, the molecule is enlarged or extended by means of primary alkylor alkanolamines or primary-tertiary alkyldiamines, such as the N,N-dialkylaminoalkyleneamines. These amines are used together with secondary alkyl- and alkanolamines, with a suitable choice of proportions ensuring that the end product contains no free epoxide groups.

The epoxy resin/amine adducts produced according to the invention have a molecular weight of 4,000 to 16,000 (by the weight method) or 1,500 to 3,000 (by the numerical method). Their glass transition temperature is between +20° C. and +45° C. For satisfactory solubility after protonization, a basicity corresponding to an amine number of at least 20 mg KOH/g is necessary, which must be taken into consideration when formulating the resin mixture.

After the reaction, the organic solvent may, if desired, be partly eliminated in vacuo. This step may optionally be carried out after the partial neutralization of the mixture and dilution with water. In these variants of the process, materials are obtained which contain only small amounts of organic solvents and, therefore, comply even with stringent environmental regulations (e.g., low-VOC regulations).

The product prepared by the process according to the invention are neutralized with quantities of acid ranging from about 20 to 45 mMol/100 g of binder (solid resin) to obtain stable and sediment-free aqueous solutions or emulsions which are suitable for electrodeposition painting. For the products according to the invention, in spite of the relatively high amine numbers and the high molecular weights, only 20 to 45 mMol of neutralizing agent per 100 g of solid resin are required in order to produce a bath material which can be diluted satisfactorily, the dispersing characteristics being greatly improved by the modifiers according to the invention.

The binders produced by the process according to the invention are processed in combination with cross-linking agents. Curing components which bring about crosslinking by means of reactions of transesterification and which are described, for example, in EP-B1-00 12 463, DE-A1-33 15 469 or AT-PS 372,099 and AT-PS 379,602, may be used for this purpose. Crosslinking may also be realized by means of blocked isocyanates or amino resins, optionally using corresponding catalysts for curing. The stoving temperatures range from about 140° C. to 190° C., depending on the curing system used.

The preparation of the bath material for electrodeposition painting, the pigmenting, the neutralization, and the dilution processes are all known to those skilled in the art. The same also applies to the coating process and the curing of the deposited films.

EXAMPLES

The following examples illustrate the invention without restricting its scope. All parts or percentages specified are units of weight, unless otherwise stated.

Production of the Modifiers

MOD 1

To a solution of 103 g (1 mol) of diethylenetriamine and 170 g of methoxypropanol, 577 g (3.1 mol) of 2-ethylhexylglycidylether are added at 60° C. within two hours and the reaction is carried out until an EPA value, as hereinafter defined, of 3.70 and a refractive index n20/d of 1.4600 are obtained. Then at 60° C. within two hours a mixture of 190 g (1 epoxy equivalent) of a bisphenol A-epichlorohydrin epoxy resin (EEW 190) and 48 g of methoxypropanol are added, and the reaction is continued until the EPA value is 2.70 and the refractive index is 1.4790. A solution of 100 g of the 80% reaction product and 30 g of methoxypropanol has a viscosity (DIN 53211/20° C.) of 60 to 80 seconds. The EPA value is determined as follows:

EPA Value

Determination of the sum of the oxirane and amine groups in milliequivalents.

0.2 to 0.4 g of resin are weighed accurately (to the milligram) and melted in 5 drops of methoxypropanol. After cooling, 25 ml of a mixture of dichloromethane and glacial acetic acid (4:1 parts by volume) are added and the resin is dissolved with gentle heating. Then at ambient temperature, 0.5 g of tetrabutylammoniumiodide and three drops of crystal violet solution are added. Titration is carried out with 0.1 N perchloric acid solution in glacial acetic acid from blue-violet to grass-green (no blue tint).

A control value (without resin) is determined in the same way $$\text{EPA value} = \frac{(A - B) \times 0.1 \times F}{\text{weight (g)}}$$

A=ml 0.1 N perchloric acid for sample
B=ml 0.1 N perchloric acid for control
F=factor of the 0.1 N perchloric acid solution Determination of factor (F) with potassium hydrogen phthalate is as follows: About 200 mg of potassium hydrogen phthalate (for each analysis) are precisely weighed out, to the nearest 0.1 mg, in an Erlenmeyer flask. After the addition of 30 ml of glacial acetic acid and three drops of crystal violet solution, titration is carried out with the approximately 0.1 N perchloric acid solution from blue-violet to grass-green.

$$F = \frac{W}{C \times 20.422}$$

W=weight of potassium hydrogen phthalate,
C=ml of the approximately 0.1 N perchloric acid solution in glacial acetic acid.

MOD 2

116 g (1 mol) of hexamethylenediamine are dissolved in 212 g of methoxypropanol. At 60° C., 379 g (2.06 mol) dodecene oxide are added and the reaction is carried out for four hours at 60° C. and for another two hours at 80° C. until an EPA value of 2.80 is achieved. After the addition of a mixture of 200 g (1 epoxy equivalent) of a polyoxypropyleneglycol diglycidylether (EEW 200, tradename DER 736, Dow Chemical) and 77 g of methoxypropanol within two hours at 60° C., the reaction is continued until an EPA value of 2.30 is obtained. A solution of 100 g of the 70% resin and 10 g of methoxypropanol has a viscosity (DIN 53211/20° C.) from 90 to 110 seconds.

MOD 3

To 103 g (1 mol) of diethylenetriamine and 170 g of methoxypropanol, 577 g (3.1 mol) of 2-ethylhexylglycidylether are added within two hours at 60° C., and the mixture is reacted until an EPA value of 3.53 is achieved at this temperature. Then a mixture of 87 g of methoxypropanol and 350 g (1 epoxy equivalent) of a diepoxy resin based on a polyoxypropyleneglycol-modified bisphenol A (BPP 350, Sanyo Chemical) is added within two hours at 60° C., and the reaction is continued until an EPA value of 2.33 is obtained. A solution of 100 g of the 80% resin and 30 g of methoxypropanol has a viscosity (DIN 532ll/20° C.) of 60 to 70 seconds.

MOD 4

To a solution of 400 g (1 mol) of a polyoxypropylenediamine (JEFFAMIN (R) D 400, Texaco Chem. Co.) in 198 g of methoxypropanol, are added within two hours, at 60° C., 391 g (2.1 mol) of 2-ethylhexylglycidylether, and the mixture is reacted until an EPA value of 2.02 is obtained. Then a solution of 475 g (1 epoxy equivalent) of a bisphenol A-epichlorhydrin diepoxy resin (EEW 475) in 119 g of methoxypropanol is added within two hours at 60° C., and the reaction is continued until an EPA value of 1.20 is obtained. A solution of 100 g of the 80% resin and 40 g of methoxypropanol has a viscosity (DIN 53211/20° C.) of 110 seconds.

MOD 5

To 103 g (1 mol) of diethylenetriamine and 165 g of methoxypropanol are added within two hours at 60° C. 558 g (3.0 mol) of 2-ethylhexylglycidylether, and the mixture is reacted until an EPA value of 3.63 is obtained. Then a mixture of 50 g of methoxypropanol and 200 g (1 epoxy equivalent) of a polyoxypropyleneglycol diglycidylether (commercial product DER 736, Dow Chemical) is added within two hours, and the reaction is continued at 60° C. until an EPA value of 2.78 is obtained. The product has a solid resin content of 80% by weight, and a refractive index n20/d of 1.463.

MOD 6:

To a solution of 104 g (1 mol) of aminoethylethanolamine and 119 g of methoxypropanol are added at 60° C. within two hours 372 g (2 mol) of ethylhexylglycidylether, and the reaction is continued until an EPA value of 3.36 is obtained. The end product has a solid resin content of 80% by weight and a refractive index n20/d of 1.4581.

EXAMPLE 1

In a suitable reaction vessel 326 g of MOD 1 (corresponding to 0.3 NH-equivalents), 570 g (3.0 epoxy equivalents) of a bisphenol A-epichlorohydrin diepoxy resin (EEW 190), 96.8 g (1.5 NH-equivalents) of 2-ethylhexylamine, and 167 g of methoxypropanol are reacted at 60° C. in a first reaction step until the NH-functionality is fully converted, i.e., until an EPA value of 2.15 is obtained. Then 1330 g (2.1 epoxy equivalents) of a 75% solution in methoxypropanol of a bisphenol A-epichlorohydrin diepoxy resin (EEW 475) and 189 g (1.8 NH-equivalents) of diethanolamine are added, and the mixture is further reacted until the NH-functionality has converted, i.e., until the EPA value is 1.60. In a third reaction step the remaining oxirane groups are reacted with 78 g (1.2 NH-equivalents) of N,N-diethylaminopropylamine for two hours at 60° C. and for a further hour at 90° C. and for three further hours at 120° C. until an EPA value of 1.45 is obtained, and diluted with methoxypropanol to give a solid resin content of 65% by weight. The viscosity DIN 53211/20° C. of a resin solution diluted with methoxypropanol to give a solid resin content of 46% by weight is 170 seconds. The molecular weights and molecular numbers determined by gel chromatography are: Mw=6800; Mn=2060.

EXAMPLES 2 to 8

In the same way as in Example 1, the mixtures listed in Table 1 are reacted. The characteristics of the reaction products are also shown in Table 1.

In reaction step 4, the procedure is that, following step 3 at 120° C., the corresponding quantity of methoxypropanol and a polyoxypropyleneglycol diglycidylether (EEW 200, tradename DER 736, Dow Chemical) are added and reacted for three to five hours at this temperature until the designated EPA value is reached.

Table 1 is as follows:

TABLE 1

(Amounts Given in g, Equivalents Shown in Parentheses)

| | Example 1 | Example 2 | Example 3 | Example 4 |
|---|---|---|---|---|
| Step 1 | | | | |
| MOD 1 - 80% Solution | 326 (0.3) | — | — | — |
| MOD 2 - 70% Solution | — | 578 (0.6) | — | — |
| MOD 3 - 80% Solution | — | — | 772 (0.6) | — |
| MOD 4 - 80% Solution | — | — | — | 1583 (1.0) |
| Epoxy Resin EEW 190 | 570 (3.0) | 570 (3.0) | 570 (3.0) | 570 (3.0) |
| 2-Ethylhexylamine | 96.8 (1.5) | 32.3 (0.5) | 77.4 (1.2) | — |
| Methoxypropanol | 167 | 151 | 162 | 143 |
| EPA Value After Step 1 | 2.15 | 2.30 | 1.99 | 1.47 |
| Step 2 | | | | |
| Epoxy Resin EEW 475 (75% Solution in Methoxypropanol) | 1330 (2.1) | 887 (1.4) | 1330 (2.1) | 887 (1.4) |
| Diethanolamine | 189 (1.8) | 189 (1.8) | 189 (1.8) | 189 (1.8) |

TABLE 1-continued

| (Amounts Given in g, Equivalents Shown in Parentheses) | | | | |
|---|---|---|---|---|
| EPA Value After Step 2 | 1.60 | 1.77 | 1.63 | 1.37 |
| Step 3 | | | | |
| N,N-Diethylamino-propylamine | 78 (1.2) | 78 (1.2) | 78 (1.2) | 78 (1.2) |
| Characteristics of the Reaction Products: EPA Value | 1.45 | 1.60 | 1.49 | 1.23 |
| Solid Resin Content (30 Minutes/120° C.) | 65% | 65% | 65% | 65% |
| Viscosity DIN 53211/20° C. 100 g of 65% Resin Solution and 40 g of Methoxypropanol | 170 s | 124 s | 160 s | 180 s |
| GPC, Ultrastyragel BCD | | | | |
| Mw Molecular Weight | 6800 | 4360 | 8452 | 9806 |
| Mn Molecular Number | 2060 | 1880 | 1431 | 2100 |

| | Example | | | |
|---|---|---|---|---|
| | 5 | 6 | 7 | 8 |
| Step 1 | | | | |
| MOD 1 - 80% Solution | 490 (0.45) | 650 (0.6) | — | 325 (0.3) |
| MOD 5 - 80% Solution | — | — | 323 (0.3) | — |
| Epoxy Resin EEW 190 | 1140 (6.0) | 722 (3.8) | 380 (2.0) | 380 (2.0) |
| 2-Ethylhexylamine | 193.5 (1.5) | 122.6 (0.95) | 64.5 (0.5) | 64.5 (0.5) |
| Methoxypropanol (MP) | 740 | 455 | 238 | 237 |
| EPA Value After Step 1 | 2.19 | 2.08 | 2.99 | 2.09 |
| Step 2 | | | | |
| Methoxypropanol | 477 | 268 | 187 | 223 |
| Epoxy Resin EEW 475 (75% Solution in Methoxypropanol) | 407 (0.6) | 1837 (2.9) | 1647 (2.6) | 1647 (2.6) |
| MOD 6 - 80% Solution | — | 952 (1.6) | — | 536 (0.9) |
| Monoethanolamine | 67.5 (0.9) | — | 67.5 (0.9) | 67.5 (0.9) |
| N,N-Diethanolamine | 94.5 (0.9) | — | 94.5 (0.9) | — |
| EPA Values After Step 2 | 1.71 | 1.71 | 1.74 | 1.61 |
| Step 3 | | | | |
| MP | 33.4 | 61.3 | 33.4 | 33 |
| N,N-Diethylamino-propylamine | 78 (0.6) | 143 (1.1) | 78 (0.6) | 78 (0.6) |
| EPA Value After Step 3 | 1.61 | 1.56 | 1.56 | 1.56 |
| Step 4 | | | | |
| Methoxypropanol | — | — | 49.3 | 57 |
| Epoxy Resin EEW 200 | — | — | 115 (0.575) | 132 (0.66) |
| EPA Value After Step 4 | — | — | 1.58 | 1.40 |
| Solid Resin Content (30 Minutes/120° C.) | 70% | 65% | 70% | 70% |
| Viscosity DIN 53211/20° C. | 84 g res. sol. +56 g MP 50 s | 84 g res. sol. +56 g MP 85 s | 80 g res. sol. +60 g MP 71 s | 80 g res. sol. +60 g MP 152 s |
| GPC, Ultrastyragel BCD | | | | |
| Mw Molecular Weight | 10739 | 14132 | 12078 | 15832 |
| Mn Molecular Number | 1910 | 2670 | 2207 | 2772 |

CROSSLINKING COMPONENT VK 1

In a reaction vessel having a device suitable for azeotropic water-solvent removal and a bubble tray column for separating the alcohol component formed during partial transesterification, 29.7 g (0.9 mol) of 91% paraformaldehyde are added in batches to a mixture of 160 g (1 mol) of diethylmalonate, 0.34 g (0.004 mol) piperidine and 0.22 g (0.004 mol) of 85% formic acid at 80° C. so that when the exothermic reaction starts the temperature does not exceed 95° C. The reaction mixture is stirred at 95° C. until the paraformaldehyde is completely dissolved. As the water cleavage starts, the temperature is raised to 110° C. within two hours. After it reaches 110° C., a total of 9 g of water are distilled off using special petrol (boiling range 80° C. to 120° C.) as entrainer. The entrainer used is subsequently removed by the application of vacuum.

After 22.8 g (0.3 mol) of propyleneglycol-1,2 have been added, the mixture is heated until distillation starts (140° C. to 150° C.). As the temperature rises, 27 parts (0.6 mol) of ethanol are distilled off. The product obtained has a solid resin content (120° C., 30 minutes) of about 92%, an hydroxyl number of less than 5 mg KOH/g, a limiting viscosity number of about 5.2 ml/g (20° C., dimethylformamide), and a refractive index n20/d of 1.4670.

CROSSLINKING COMPONENT VK 2

480 g (3 mol) diethylmalonate and 134 g (1 mol) of trimethylolpropane are heated to 130° C. 135 g of ethanol are separated off as distillate, with a gradual temperature increase to 165° C., while the refractive index of the distillate is monitored. Then, as the vacuum increases, at 160° C. more volatile components are distilled off until the solids content of the reaction mass (120° C., 30 minutes) is 95%. The product obtained has an hydroxyl number of less than 5 mg KOH/g and a refractive index of n20/d 1.4660.

CROSSLINKING COMPONENT VK 3

In accordance with the process described in VK 1, a mixture of 134.4 g (0.84 mol) of diethylmalonate, 0.286 g (0.0034 mol) of piperidine, and 0.185 g (0.0034 mol) of 85% formic acid is reacted with 13.86 g (0.42 mol) of 91% paraformaldehyde, while a total of 9.24 g (0.51 mol) of water are distilled off. The product has a solids content of 78% (120° C., 30 minutes). The refractive index yields a value of n20/d=1.437.

Then 134 g (1 mol) of trimethylolpropane are added and the mixture is heated until distillation starts (140° C. to 150° C.). As the temperature rises, 23 g (0.5 mol) of ethanol are distilled off. After the theoretical quantity of distillate is reached, 263 g of diethyleneglycol dimethylether (DGDME) are used to dilute the charge, and the mixture is cooled to 30° C. At 30° C. within six hours 800 g (2.5 mol or 2.5 NCO-equivalents) of the reaction product of 2.5 mol toluylenediisocyanate (standard commercial isomer mixture) and 2.5 mol of ethyleneglycolmonohexylether are added. In a further four hours, the temperature is increased to 100° C. and the mixture is reacted at this temperature until an NCO-content of less than 0.01 milliequivalents per gram of sample is obtained.

The product obtained with a solid resin content of 80% (120° C., 30 minutes) has a refractive index n20/d of 1.507 and a viscosity (10 g resin solution +4 g DGDME) of E-F (Gardner-Holdt).

TESTING OF THE PRODUCTS OF EXAMPLES 1 to 8 IN CATHODICALLY DEPOSITABLE PAINTS

The products produced according to the invention are reacted, under the conditions specified in Table 2, with a crosslinking component in 70% solution in methoxypropanol. From these binder solutions, paint pastes are produced in the usual way corresponding to the following formulation:

100 parts of binder (solid resin)
36.5 parts of titanium dioxide
3 parts of lead silicate
0.5 parts of carbon black These paint pastes are protonized with the quantity of acid specified in Table 2 and then diluted with deionized water to give a solids content of 18%.

The catalyst used for the curing was lead in the form of lead octoate in a quantity of 1 part lead (metal content) to 100 parts of solid resin binder.

Disposition is carried out on zinc phosphatized sheet steel at a bath temperature of 28° C. and with a coating time of two minutes. The sheets thus coated were then stoved for 30 minutes at 160° C. The test results are assembled in Table 3.

Tables 2 and 3 are as follows:

TABLE 2

| Binder Combination | Crosslinking Component VK | Parts of Solid Resin from Example | Reaction Conditions Basic Resin/VK | | Neutralizing Agent Required in mMol of Formic Acid Per 100 g of Solid Resin |
|---|---|---|---|---|---|
| 1 | 30 parts VK 1 | 70 parts Ex. 1 | 2 hrs | 120° C. | 30 |
| 2 | 20 parts VK 2 | 80 parts Ex. 2 | 1 hr | 100° C. | 25 |
| 3 | 20 parts VK 3 | 80 parts Ex. 3 | 30 min | 60° C. | 35 |
| 4 | 25 parts VK 2 | 75 parts Ex. 4 | 1 hr | 120° C. | 35 |
| 5 | 25 parts VK 1 | 75 parts Ex. 5 | 2 hrs | 100° C. | 30 |
| 6 | 30 parts VK 3 | 70 parts Ex. 6 | 1 hr | 90° C. | 35 |
| 7 | 30 parts VK 2 | 70 parts Ex. 7 | 3 hrs | 120° C. | 30 |
| 8 | 20 parts VK 1 | 80 parts Ex. 8 | 1 hr | 120° C. | 30 |

TABLE 3

| Binder Combination | Precipitation Volt | Layer Thickness μm | Surface Quality Roughness Ra[1] in Micrometers | Salt Spray Test ASTM B-117-64 in Hours[2] |
|---|---|---|---|---|
| 1 | 390 | 36 | 0.24 | >1000 |
| 2 | 360 | 28 | 0.28 | 920 |
| 3 | 360 | 30 | 0.30 | >1000 |
| 4 | 330 | 26 | 0.26 | 920 |
| 5 | 390 | 30 | 0.20 | >1000 |
| 6 | 390 | 28 | 0.25 | >1000 |
| 7 | 330 | 34 | 0.28 | 920 |
| 8 | 390 | 36 | 0.21 | >1000 |

[1]The roughness values were measured using the "Surftest 201" apparatus made by Mitutoyo.
[2]Up to the number of hours specified, the attack on a cross-shaped cut is less than 2 mm.

As will be apparent to one skilled in the art, various modifications can be made within the scope of the aforesaid description. Such modifications being within the ability of one skilled in the art form a part of the present invention and are embraced by the appended claims.

It is claimed:

1. Cathodically depositable paint binders based on modified epoxy resins/amine adducts wherein said binders contain 5% to 30% by weight, based on the modified epoxy resin/amine adduct, of a modifier of general formula

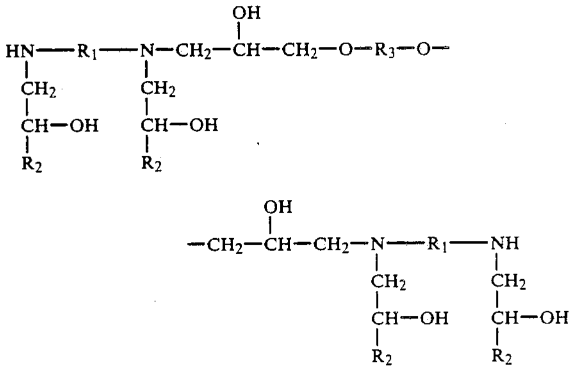

wherein $R_1$ represents the same or different groups $-C_nH_{2n}-$ or $-(C_nH_{2n}O)_m-C_nH_{2n}-$ or -continued

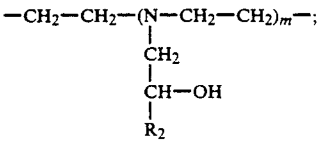

$R_2$ represents the same or different groups $-C_nH_{2n+1}$ or $-O-C_nH_{2n+1}$ or 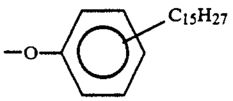

$R_3$ represents the group

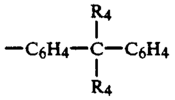 or $-(C_nH_{2n}O)_m-$ or

-continued

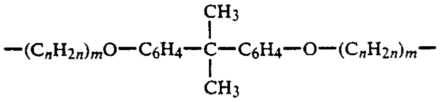

$R_4$ represents a hydrogen atom or a methyl group, n and m are integers between 2 and 8 but, in the case of $R_2$, n is an integer between 8 and 20, and which has been reacted with at least 2 mol of polyepoxy resins at least one member selected from the group consisting of a primary alkylamine, secondary dialkylamine, primary alkanolamine and a secondary dialkanolamine; and a primary-tertiary alkyldiamine to form an epoxy resin/amine adduct which is free from epoxide groups, waterdilutable after neutralization with acids and has a molecular weight of 4,000 to 16,000, by the weight method, or 1,500 to 3,000, by the counting method, a glass transition temperature of +20° C. to +45° C., and an amine number of at least 20 mg KOH/g.

2. The paint binder according to claim 1 wherein said binder contains from 10% to 20% by weight of said modifier.

3. The paint binder according to claim 1 or 2 wherein said polyepoxy resin is a diepoxy resin.

4. An electrodeposition paint comprising a paint binder according to claim 1.

* * * * *